Figure 1:
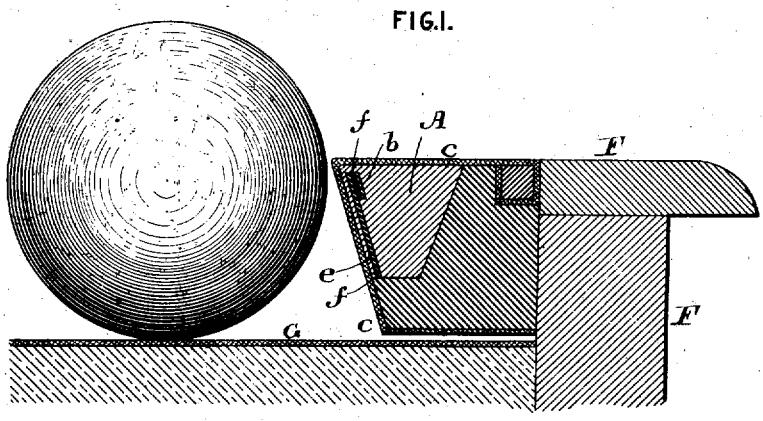

H. W. COLLENDER.

BILLIARD TABLE CUSHION.

No. 10,647. Reissued Sept. 29, 1885.

ATTEST.

J. Henry Kaiser.

Jacob Felbel

INVENTOR.

Hugh W. Collender.

By J. V. McIntire.

Att'y.

UNITED STATES PATENT OFFICE.

HUGH W. COLLENDER, OF NEW YORK, N. Y.

BILLIARD-TABLE CUSHION.

SPECIFICATION forming part of Reissued Letters Patent No. 10,647, dated September 29, 1885.

Original No. 292,990, dated February 5, 1884. Application for reissue filed December 11, 1884.

*To all whom it may concern:*

Be it known that I, HUGH W. COLLENDER, of New York city, in the county of New York and State of New York, have invented certain new and useful Improvements in Billiard-Table Cushions; and I do hereby declare that the following is a full, clear, and exact description thereof, reference being had to the accompanying drawings, making part of this application.

My invention relates to a novel construction of cushion-strips for the cushions of billiard-tables.

As is well known to those familiar with the manufacture and use of rubber cushion-strips for billiard-tables, the most successfully operative cushion-strips are those which have the main or body portions composed of a comparatively soft compound of vulcanized rubber, while the faces are composed of some much harder compound or material.

Previous to my present invention various materials and substances have been combined in different ways with the softer and main portion of the cushion-strip for the purpose of producing the harder facing, and numerous patents have been granted to myself and others for numerous methods of constructing cushion-strips of the type alluded to—*i. e.*, a cushion with a soft body and a comparatively hard face—and cushion-strips have been made harder by the use of one or more strips of metal or other harder and resilient material, combined with the working-face of the soft-rubber strip, and either forming the extreme outer surface of the cushion or placed slightly within the face surface, so as to have a thin film or layer of softer material intervene between the face-hardening strip and the cloth covering of the cushion, to render the action of the cushion more noiseless, and also to lessen the wear on the cloth cover; and as long ago as September 25, 1860, United States Letters Patent were granted to me for a cushion composed of a soft-rubber body and a face-hardening strip of hard rubber, the face-hardening strip being covered on its outer surface with a thin layer of the soft-rubber compound, to prevent too rapid wear of the cloth covering, and to render the face-hardened strip less noisy under the action of the balls. At the same time, for certain games and to suit the wishes of many billiard-players, it is desirable to have a cushion faster than the one just referred to, provided one can be made possessing also all the desirable qualities of the one mentioned.

I have devised a novel or improved cushion-strip, which, while it possesses all the good qualities of the best face-hardened cushions heretofore made, is a faster cushion, or will give to the balls more "legs," and have thus gained an important desideratum in the manufacture of cushion-strips.

My present invention may be said to consist in a cushion-strip formed mainly of the usual soft-rubber compound, and having combined with it a face-hardening strip composed of the hard compound of rubber, the said strip of harder material being located slightly back of the working-surface of the cushion-strip, and made narrow enough to yield bodily to the impact of the balls, and tied down to the root of the cushion, all as will be hereinafter more fully explained.

To enable those skilled in the art to which my invention appertains to make and use cushion-strips embodying my improvement, I will now proceed to describe the same, referring by letters to the accompanying drawings, forming part of this specification, and in which I have shown my invention carried out in that form which is best now known to me.

Figure 2:
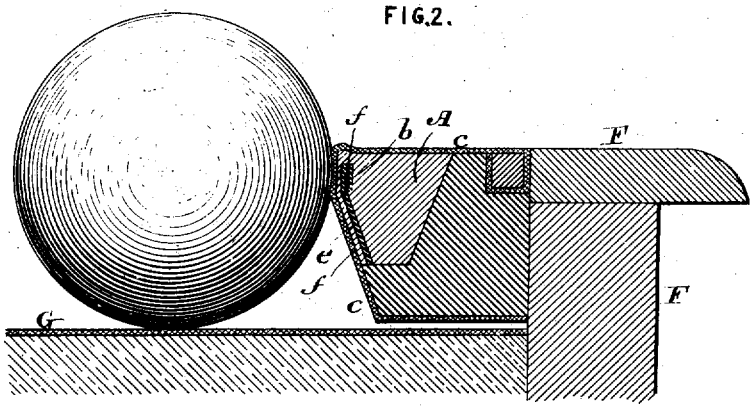

In the drawings, Figure 1 is a vertical section of a cushion-strip embracing my invention and applied to a billiard-table in about the usual manner, while Fig. 2 is a similar view showing the action of the cushion by illustrating about the manner in which the cushion is affected by the blow of the ball.

In the two figures the same part will be found designated by the same letter of reference, and in both A represents the body or main portions of the rubber cushion-strip; *b*, the face-hardening device, and *c* the usual (green) cloth covering.

F is a part of an ordinary cushion-rail, and G portion of the bed of a table.

The body or main portion of the cushion-strip A is made, as shown, of about the usual shape of the "diamond-pattern" cushion-strips, and is composed of the soft-rubber compound generally used for cushions, while the face-hardening strip *b* is composed of what is known as the "hard compound of rubber," and is incorporated within the softer material, so that a layer of the soft material will exist at the outer surface of the cushion, as seen at *c*, for the well-known purpose of avoiding the noise and wear that would be occasioned were the balls, in striking, to have nothing interposed between their surface and that of the hard-rubber strip *b* except the usual cloth covering.

In making my improved cushion-strip I by preference form it of several layers or strips of the soft compound laid together with the interposed strip of hard rubber *b*, and then have the entire mass subjected to the usual vulcanizing process in the metallic mold generally used; but some other mode of manufacture may of course be followed.

Before incorporating or enveloping the hard-rubber strip *b* within the soft-rubber mass, I apply to said strip a jacket or wrapper of canvas or other suitable non-stretchable material, (that will withstand the vulcanizing process to which the rubber has to be subjected,) which, as seen at *f*, envelops or covers the strip *b*, and also extends from the lower edge of said strip nearly or quite down to the root (or lowermost part) of the soft-rubber body A. The presence of this wrapper, extending thus downwardly, is important to the novel and successful operation of the cushion shown, since it performs the essential functions of rendering that part of the front surface below the locality of the inserted strip *b* incapable of stretching or yielding in an upward direction, and of preventing the tendency of said strip *b* to rise when struck by the balls, and thus strain its superficial cementation or jointure with the surrounding soft-rubber mass.

It is important in a combination-cushion to have the face-hardening device maintain, under the hammering action of the balls, a perfect union with the surrounding soft rubber, (or, in other words, with the surrounding walls of the cavity or pocket in which it is incased,) because otherwise the constant and severe pounding will ere long separate the combined parts, and thus seriously affect the designed and perfect operation of the cushion. Any separation of the adjacent surfaces of the strip *b* and body portion A is effectually prevented by the canvas device referred to, which not only, as mentioned, holds down the strip *b* against any tendency to slide upwardly when struck by the balls, but also facilitates a more lasting cementation of the parts than might occur were the strip *b* incorporated without any fibrous envelope.

I have shown the canvas envelope as having only a single ply or thickness extending down from the lower edge of strip *b*; but it may of course be double, if desired. So, also, may more than one strip *b* be employed, and the arrangement be varied so as to have said strip run obliquely to, instead of parallel with, the outer surface of the cushion; but I deem the plan and arrangement shown the preferable ones. The strip *b*, it will be seen, is of much less width than the face of the cushion. It is, in fact, comparatively narrow, and this is another desirable, if not essential, feature of the construction shown, for it renders the action of the cushion better than it would be were the face-hardening strip wider. It is only a very narrow horizontal strip or portion of the outer face of the cushion that the balls ever come into contact with, and it is this narrow strip that is really the working-face of the cushion, though of course the other portion of the outer front surface (as well as the backing of the face) is necessary to the proper action of the cushion's working-face. Now, as the useful function of the hard but resilient strip *b* is to impart to the greatest superficial extent of the soft backing and in the best manner the force of impact of the blow of the ball, it follows that these ends must be better accomplished in a case in which the strip *b*, when struck, will yield bodily backward than in a case in which said strip, by bending crosswise of itself, will go backward only near its top edge, and certainly if the strip *b* be narrow, as shown, it will move bodily backward under the force of the ball's blow, whereas if it be as broad as the whole front surface of the cushion it will only bend back at and near its upper edge. Again, when the strip *b* is made narrow enough to go back bodily, (widthwise,) instead of bending backwardly at its top edge, there is much less liability of the ball riding up over, or, as it is technically called, "jumping," the cushion, and thus leaving the table.

By reference to Fig. 2 it will be seen that under the impact of a ball impelled forcibly against the cushion the strip *b* maintains a position such as to prevent any jumping of the ball, and also, in yielding backwardly, (from the position seen at Fig. 1,) transmits in a very desirable manner the force of impact to the greatest area of soft backing, so as to get a very effective repelling action of the cushion on the ball, thus making the cushion faster or more lively than face-hardened cushions heretofore made.

The sizes and proportions of the parts may of course be more or less varied without materially changing the operation and effectiveness of the improved cushion shown, and hence without departing from the spirit of my invention. I do not therefore wish to limit myself to any precise details of construction so long as the structure involves the novel features and peculiarities explained. Modifications may of course be made in the placement or arrangement of the anchoring canvas strip that ties down the narrow strip *b*, and also prevents the body portion beneath from stretching under any action of the ball tending to pull up the face of the cushion, (which tendency of course is greatest when the smallest balls are used to play with,) and supplemental canvas devices may be used (by molding them in) to prevent stretching in other directions without departing from the principle of my invention.

What I claim as new, and desire to secure by Letters Patent, is—

A cushion-strip composed of a soft-rubber body, a face-hardening strip or strips, and means, substantially such as described, for holding down (against any upwardly-stretching tendency) such strip or strips, said soft-rubber body, said face-hardening strip or strips, and the device for holding the latter down being all firmly united in the final and usual process of vulcanization, as set forth.

H. W. COLLENDER.

Witnesses:
JACOB FELBEL,
F. H. JONES.